US007047502B2

(12) United States Patent
Petropoulos et al.

(10) Patent No.: US 7,047,502 B2
(45) Date of Patent: May 16, 2006

(54) METHODS AND APPARATUS FOR MOUSE-OVER PREVIEW OF CONTEXTUALLY RELEVANT INFORMATION

(75) Inventors: John Petropoulos, Hopkington, MA (US); Clay A. Johnson, Arlington, MA (US)

(73) Assignee: Ask Jeeves, Inc., Oakland, CA (US)

( * ) Notice: Subject to any disclaimer, the term of this patent is extended or adjusted under 35 U.S.C. 154(b) by 571 days.

(21) Appl. No.: 09/961,465

(22) Filed: Sep. 24, 2001

(65) Prior Publication Data

US 2003/0146939 A1 Aug. 7, 2003

(51) Int. Cl.
*G09G 5/00* (2006.01)

(52) U.S. Cl. ............... 715/781; 715/810; 715/760

(58) Field of Classification Search ........ 345/781–807, 345/856–862; 715/781–783, 802–805
See application file for complete search history.

(56) References Cited

U.S. PATENT DOCUMENTS

| 5,794,237 | A |   | 8/1998  | Gore, Jr.    |         |
|-----------|---|---|---------|--------------|---------|
| 5,855,015 | A |   | 12/1998 | Shoham       |         |
| 5,886,698 | A |   | 3/1999  | Sciammarella |         |
| 5,930,501 | A | * | 7/1999  | Neil ......... | 713/400 |
| 5,982,369 | A |   | 11/1999 | Sciammarella |         |
| 6,006,222 | A |   | 12/1999 | Cullis       |         |
| 6,012,053 | A |   | 1/2000  | Pant et al.  |         |
| 6,014,665 | A |   | 1/2000  | Culliss      |         |
| 6,070,176 | A |   | 5/2000  | Downs        |         |
| 6,078,916 | A |   | 6/2000  | Cullis       |         |
| 6,119,114 | A |   | 9/2000  | Smadja       |         |
| 6,134,566 | A |   | 10/2000 | Berman       |         |
| 6,160,554 | A | * | 12/2000 | Krause ....... | 345/804 |
| 6,182,068 | B1|   | 1/2001  | Culliss      |         |
| 6,240,408 | B1|   | 5/2001  | Kaufman      |         |
| 6,271,840 | B1|   | 8/2001  | Finseth      |         |
| 6,405,192 | B1| * | 6/2002  | Brown et al. ........ | 707/3 |
| 6,606,101 | B1| * | 8/2003  | Malamud et al. ..... | 345/715 |
| 6,683,633 | B1| * | 1/2004  | Holtzblatt et al. .... | 345/854 |
| 6,724,406 | B1| * | 4/2004  | Kelley ........ | 345/804 |
| 2002/0080170 | A1 | * | 6/2002 | Goldberg et al. ..... | 345/748 |
| 2002/0163545 | A1 | * | 11/2002 | Hii ............... | 345/838 |
| 2003/0001900 | A1 | * | 1/2003 | Cabanes et al. ...... | 345/810 |
| 2003/0081013 | A1 | * | 5/2003 | Allen et al. ........ | 345/853 |

OTHER PUBLICATIONS

Google (http://web.archive.org/web/20010330082509/www.google.com/help/interpret.html).*

(Continued)

*Primary Examiner*—Kristine Kincaid
*Assistant Examiner*—Thanh Vu
(74) *Attorney, Agent, or Firm*—Blakely, Sokoloff, Taylor & Zafman; Stephen M. De Klerk

(57) ABSTRACT

Challenges to the analysis of search results may be mitigated by offering preview information when users navigate a computer-pointing device over pre-designated areas of a search result page. A separate icon in the pre-designated area enhances the advantages by providing intuitive preview ability with seamless and natural control over a variety of preview options, such as the type of preview information and the manner in which it is presented. In addition, while operating a preview-enabled search result page, users' behavior provides data and attributes, which may be re-incorporated into the searching algorithm to improve the relevancy of search results.

4 Claims, 7 Drawing Sheets

OTHER PUBLICATIONS www.capitalsearch.ca, screen shot Aug. 22, 2001.
www.lot.com, screen shot Aug. 21, 2001.
Microsoft Outlook 2000SR-19.0.0.4506 screen shot.
www.google.com/ie, screen shot on Aug. 22, 2001.
www.alexa.com, screen shot description of services Aug. 27, 2001.
www.wisenut.com, screen shot, no date.
Google Art—Aug. 22, 2001.
Web Representation with Dynamic Thumbnails. Stefan Schmid (sschmid@mobileipv6.net), Department of Distributed Systems, University of Ulm, Germany. First publication IEEE YuForic, Stuttgart, Germany, Jul. 1998. Available at: http://www.mobileipv6.net/~sschmid/publications.shtml, http://citeseer.nj.nec.com/428225.html.
Visual Preview for Link Traversal on the World Wide Web. Theodorich Kopetzky (theo@tk.uni-linz.ac.at), Max Mühlhauser (max@tk.uni-linz.ac.at), Telecooperation Dept., Johannes Kepler University Linz, Altenbergerstrasse, Linz, Austria. First publication: The Eighth International World Wide Web Conference, 1999. Available at: http://www8.org/fullpaper.html http://decweb.ethz.ch/WWW8/data/2176/pdf/pd1.pdf.

* cited by examiner

METHODS AND APPARATUS FOR MOUSE-OVER PREVIEW OF CONTEXTUALLY RELEVANT INFORMATION

This application is related to U.S. patent application Ser. No. 09/961,466 entitled "METHODS AND APPARATUS FOR MOUSE-OVER PREVIEW OF CONTEXTUALLY RELEVANT INFORMATION," by John Petropoulos, et al., filed on Sep. 24, 2001, which is hereby incorporated herein by reference.

BACKGROUND OF INVENTION

1. Field of the Invention

The invention relates to searching large amounts of information and analyzing the results of such a search. In one broad application of the invention, it relates to the area of web page searching either on the Internet or on Intranets. Furthermore, in the web context, the invention relates to improving the efficiency of analyzing search results and using the data gathered from efficient analysis to refine and improve the search process.

2. Description of the Related Art

Generally, the usefulness of any type of information is based upon a critical ability to find and adapt contextually relevant information in a timely manner. For example, if a cook is looking for a recipe, the existence of that recipe in an unidentified book of unknown whereabouts is not at all useful. Furthermore, even the book's identity and location would not be useful if it were not somehow readily accessible. Moreover, even if the cook were in possession of the correct book, without an index or table of contents, the process of finding and using the recipe would not be very efficient. Lastly, even an index and table of contents do not allow a cook to efficiently scan a large offering of recipes as compared to other techniques such as an index of pictures of the prepared foods.

From this illustration, one can easily see the importance of methods and systems, and the dimensions of information analysis that are required for efficient information location and retrieval. In fact, most everyone has learned how to use several simple systems such as those incorporated in libraries, dictionaries, maps and books. Few in our world, however, understand the methods and systems for finding information that is ultimately digitized or managed by machines such as computers. In the world of machine-managed information, there have been many propositions and techniques for solving these information location problems Most commonly, the process of finding relevant information begins by reorganizing the entire universe of accessible information. For example, the phone company typically organizes phone numbers in the alphabetical order of the phone owners' names rather than organizing them in number order or by address. Of course, this allows users to find a number in the book knowing only someone's name. This same principle applies in the databasing of machine-managed information, where for example, a computer-user may create a database for contact information perhaps using a program such as Microsoft Access. After creating the database (the information repository), the computer user must populate it with data—this being the actual list of contacts. Each contact (generically called a record in database terminology) might include a name field, an address field, a phone number field and any number of other fields pertaining to personal contact information. Once the database is populated, a user can typically retrieve information based upon attributes of the data in one or more fields of the database. In summary, the data reorganizing (or pre-organizing) facilitates more easy retrieval of relevant information.

As databases and the records within them become larger, the reorganizing task can become larger and impede the ability to quickly and easily find relevant results. The problem is greatly increased when the exact form or nature of the records is inconsistent and not fully predictable. An example of this situation might be a document database wherein the records (documents plus attributes) are in variable forms (text, rtf, Microsoft Word, JPEG, TIFF etc.). In this type of database, a business manager might be looking for a certain report, but only recall two vague attributes about the report, possibly the month the document was created and the names of several people who might have created it. In this situation, the database will likely return a long list of documents every document created by one of the listed people during the specified month. Generally, the manager would then have very few options for further examining the long list. She could open each document and look at it or potentially look at the entire attribute list for each document. These options are unwieldy and time consuming and may not even ensure success.

An obviously large manifestation of this problem is in searching the world- wide-web or any web-like information collection (such as an intranet). Common search tools use various techniques to relate search terms or queries to web pages or web sites. The clear object is to find web pages that are most relevant to the search terms or query. However, given (i) the size and nature of the Internet and most intranets, and (ii) the skill level of most users, there is only a small likelihood of returning a single and perfect match for the search terms or query. Therefore, in order to increase the likelihood of retuning a perfect match, common search tools return an extremely long list of possible matches that are presented to the user in order of machine-determined relevance. This is very similar to the manager's document search problem discussed above. In the web context, the user is forced to click-through to successive documents on the list in order to determine the actual relevance to the search terms. This is clearly far less than ideal.

In order to improve this inefficiency, some products and services have returned an enhanced list, wherein each listing contains more information about the underlying record or document. Some examples of this information are (i) extra presumptively relevant textual information (ask.com, altavista.com, and yahoo.com); (ii) address information; (iii) revision information; or (iv) a small thumbnail image of the web page or document that a particular listing represents (capitalsearch.ca).

SUMMARY OF INVENTION

The inventions described here propose to mitigate the problems and challenges of analyzing the results of a database query or Internet or intranet search. In general, the inventions achieve this result by displaying preview information associated with each item on a list of results. In a very general sense, the preview information is a "preview window" containing some relevant preview information, such as a readable size image of the actual page or document associated with an item in the results list. Moreover, the ease of search-result navigation and analysis is further improved by opening the preview window when the user navigates over an intuitively connected place on the results page. The navigation takes place using any pointing or navigation device on the client system, for example, the mouse pointer, a touch screen or a sequential or moving highlight caused by a keystroke or combination of keystrokes. The invention further contemplates that a dedicated preview icon is beneficial and that such an icon can function as a menu for controlling previewing or that the icon could transform into such a menu. In addition to improving search result analysis the invention proposes improved search algorithms based upon attribute data from users' use of preview search results.

BRIEF DESCRIPTION OF DRAWINGS

A better understanding of the invention can be had when the following detailed description of the preferred embodiments is considered in conjunction with the following drawings, in which.

DETAILED DESCRIPTION

I. Concepts in Implementation

Figure 1:
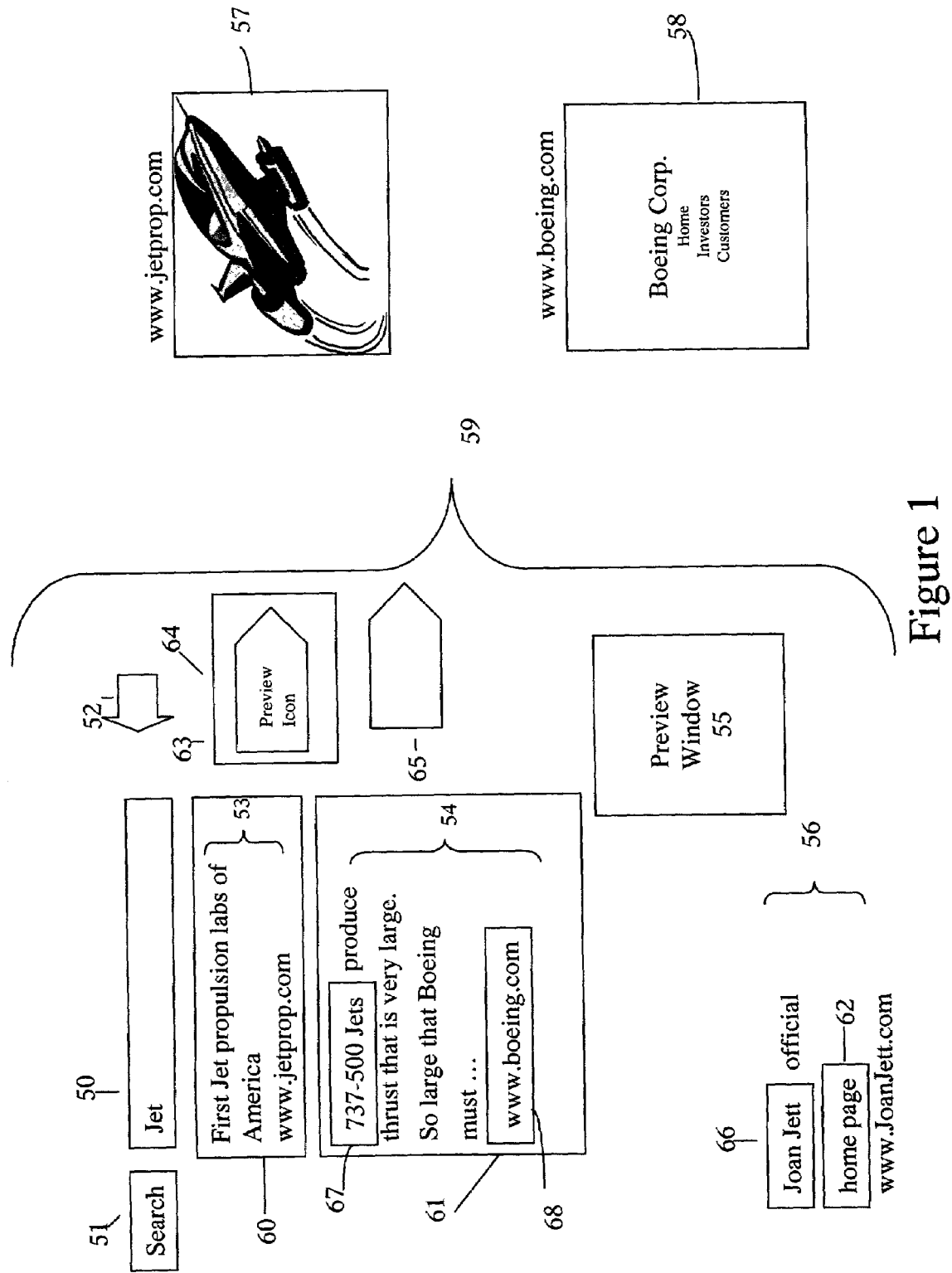
FIG. 1 shows a generic search results page (59) and two web pages (57 & 58) associated with specified results on the results page.

Referring to FIG. 1, web page 59 refers to a generic and imaginary search- results page as displayed by a generic browser. The context for search-results page 59 is that an Internet search for "Jet" has just been completed (thus the word "Jet" remaining in search entry box 50). A first result 53 is shown along with a second result 54 and an nth result 56. In addition, web page 57 is the actual web page referred by and associated with first result 53 (as displayed by a generic browser). Typically, all or some portion or portions of first result 53 will be a hyperlink or hyperlinks to web page 57. Preview Icon 63 is associated with search result 53 and will be explained later. Similarly, web page 58 is the actual web page referred by and associated with second result 54. Hyperlinks 67 and 68 show that the character strings "737-500 Jets" and www.Boeing.com serve as hyperlinks perhaps to web page 58 and the Boeing home page respectively. As discussed in the background, generally first result 53 is presumptively more relevant to the search term "Jet" than second result 54 and certainly more relevant than nth result 56.

Mouse pointer 52 is a common pointer as may be controlled by a standard mouse, trackball, keyboard pointer, touch screen or any user manageable device (hereinafter the term "mouse pointer" is used in the broadest sense the context permits to refer to any one or more of these navigation tools). Using various commercially available software and hardware, mouse pointer 52 can visually appear as nearly any object a user desires. A user may navigate around search-results page 59 by using the motion of mouse pointer 52 and a combination of well-known and well-documented keystrokes.

II. Mouse-over Creates Preview

Referring back to search-result page 59 as a whole, recall that this is a result returned after a user has performed a search on the term "Jet." The user must then analyze those results and will typically do so using the combinations of keystrokes and the pointer tool. A feature of the current invention is that the user is shown preview information when the mouse pointer 52 navigates or passes over a defined area such as first defined area 60, second defined area 61, or other defined areas 62, 64, 66, 67, 68 (Hereinafter, the action of navigating or passing the mouse pointer over a region is referred to as a "mouse-over"). The defined areas are program-designated (perhaps with JavaScript) areas on results page 59. While these defined areas could be made visible, they are generally invisible to the user. In one embodiment, upon a pre-defined placement or action of the pointer (e.g. a mouse-over), instructions are sent to the user's web browser to automatically open an embedded preview window and render the relevant contextual information inline with the user's results. In various implementations of the invention, defined areas may be in any shape or size, located anywhere on the page and may be configured by a programmer, the user, or any process with sufficient access to the system.

III. Many Types Of Preview Information

Differing implementations of the invention allow for virtually any type of preview information to be shown to the user. The preview information shown when there is a mouse-over of defined area 60 will generally be intuitively related to the page content surrounding defined area 60. For example a mouse-over defined area 60, might cause display of the actual content or the web page referred by or associated with first result 53 (such as web page 57).

Rather than displaying the actual content referred by and associated with a result, the same mouse-over might cause the system to display information merely related to the actual content of web page 57. For example, related preview information may include web pages with relevant and similar content to web page 57. In addition, related information may also include a list of URLs representing all or some of the links contained or identified in web page 57. Similarly, related information might include a list of URLs of either (i) web pages that link to web page 57 or (ii) the entire website that web page 57 resides in. With respect to URLs used as preview information, in some embodiments of the invention these URLs will function as links. Furthermore, in order to reduce the appearance of aesthetic information overload, a user or programmer may control the maximum number of URLs displayed in a single preview.

Alternatively, the same mouse-over might cause display of contextual information about web page 57 such as a view of the home page associated with web page 57 or other pages within the same domain as web page 57. In this case, several pages might be displayed (either overlapping or adjacent) as preview information. The invention contemplates that the user or a programmer might configure how to sort the pages returned as preview information, for example, they may be sorted by relevance to the query, or they may be in a fixed order such as home page on top.

The invention also contemplates that the user or a programmer might configure how to sort the pages returned as preview information by hits to a page. This is the sorting of the pages under a specific domain based on the number of hits that each page has had (not based on a popularity algorithms that requires a specific query- url pair and would not be appropriate here). For example, presume a mouse-over of a result indicating the page www.shoes.com/loafers. The preview may show associated pages shoes.com ranked only by the search authority's record of the number of hits that each page has had over a specified period. Therefore, the user might see #1) shoes.com (300 hits in the past year); #2)

shoes.com/locations (200 hit in the last years) and, #3) shoes.com/sneakers (100 hits in the last year), etc.

Other contextual information that might be displayed as a preview includes the creation date of a web page, the last refresh date of a web page, the file size of a web page, the number of links-in on a web page, or the number of links-out on a web page. Contextual information might also include information regarding the URL registration pertaining to web page 57 (such as its owner, location, or registration date.), or information regarding the URL itself (such as its geographic location). In addition, the same mouse-over of defined area 60 might cause display of preview information to aid in further search, such as the identity of web pages or sites similar or related to web page 57. Similarly, the preview information might actually be one or more pages from a similar site. In fact, these two techniques may be cascaded in that a first preview window may display a list of similar sites or pages and then as each item in the list is moused-over, a preview of the referenced site or page may be displayed. Expanding on this cascading concept, further or more efficient search may be aided by using preview displays to help drill through a directory structure. In particular, each mouse-over of an item would display the list of applicable sub-categories, then each mouse-over of one of the subcategories would display a further list of sub-sub categories and so on.

In the same context, further search efforts might be aided by providing another set of search results as preview information. This is particularly applicable to a mouse-over proximate to a suggested alternative search term or query (virtually all commercial search tools offer suggestions for alternative search terms or queries). In this embodiment, the system executes a new search when the user mouses-over an alternative search term and the preview window displays what is effectively a new search results page (typically containing 10 results).

In addition to being informational in such a way as to aid analysis, the invention contemplates preview information that is transformative. For example, a mouse-over of defined area 60 may cause display of a language translation of web page 57. This feature and other types of transformative functions can be implemented generally two ways. One general method is to pre-transform all or some of the target pages of information at an appropriate time, such as by submitting the pages to a machine translator proximate to the return of the search results. Alternatively, the target information may be submitted to a machine translator upon the mouse-over of defined area 60. In either case, the preview information displayed would be the output of the translator. Another transformative preview might be a definition, or a list of synonyms or antonyms. The techniques for implementing this mirror the translation example. For such a transformative uses, the invention contemplates that the user or a programmer may designate the file size available for transformation and the percent of file to be transformed.

The preview information may also be pre-aged by the programmer for the benefit of the providing of a message that may or may not intuitively relate to the defined area. An example of this type of preview information would be a logo, an advertisement, an instruction or any text or graphic message designated by the programmer. In this same context, the programmer of a web page may tag certain information on her pages for use by those accessing the web page, especially robots (like crawlers and spiders) assembling information to aid users to find the page. These tags would define what preview information the web page creator intends for use by a preview-generating search tool.

As discussed in examples above, the invention allows for the type of preview information to be fixed or user-programmable. Specifically, a user or programmer may decide what type of preview information is displayed either dynamically (based upon operational context such as the page content and user mousing/keystrokes) or in a fixed way (e.g., the page referred by and associated with the result is always displayed). In one embodiment, all the information displayed is configurable in the "conf" file and is determined by a programmer that owns or controls the web page displaying the search results. A "conf" or configuration file sets the variable parameters of an application. For example a configuration file sets the number of search results for a results page (typically 10), but this number can be increased or decreased in the configuration file. In some ways the Page Setup feature in MS Word is similar to a configuration file. In the first instance (page size) the configuration file is managed by the back end (meaning by the programmer at the website or search provider) while in the Page Setup example the conf file is accessible to the user.

Accordingly, in various embodiments, the invention may be deployed such that a user or the programmer may select one or more of the following: location of the defined area (either as a technical location on the page or by relation to visible text or graphics on the page); size of the defined area; and which type of preview information to associate with the each defined area.

IV. Preview Icons

Result analysis is clearly aided by previewing web page 57 when there is a mouse-over of defined area 60. This is because web page 57 is the actual web page referred by and associated with first result 53 and defined area 60 is intuitively related—by partial co-location—to first search result 53. The intuitive connection and analysis benefit remains for any approximate co-location of a search result with a defined area. In addition, however, a strong intuitive connection is made between a search result and a separately located defined area if the defined area overlaps some visual indication of its relevance and/or it is logically located with respect to the search result. There are several embodiments of the current invention that exploit this principle. Referring again to FIG. 1, preview icon 63 is located on web page 59 in a place that is logically related to first result 53. Furthermore, defined area 64 is on web page 59 partially co-located with preview icon 63. When the user mouses-over defined area 64 (and approximately over preview icon 63), the preview information is displayed (in this case web page 57).

The preview icon 64 offers advantages in that it alerts a user to the preview feature and then allows the user to purposefully select preview using only navigation of mouse pointer 52. Furthermore, the preview icon 63 may be a control panel to control the users options for some or all of the functionality related to the preview function. In addition, the preview icon may transform (either by click, time latency or other input mechanism) into a control panel for the same reasons.

V. Multiple Previews Per Result

The invention contemplates that two or more previews may be used with the same result. Referring again to FIG. 1, nth result 56 is partly co-located with both defined area 66 and defined area 62. The invention provides that mousing-over each defined area will produce a different preview result, for example different types of preview information (discussed above) or different mechanisms for the presentation of the preview (discussed below).

VI. Displaying Previews

The invention contemplates that the preview information may be displayed in any manner that the client system may facilitate. Commonly, the preview information may be displayed in a Frame opened proximate to the time of the mouse-over. In particular, one embodiment calls for an Inline Frame that opens proximate to the time of the mouse-over and endures approximately until the mouse-over ends or the user exercises a commit or control. However, the preview information may also be displayed in one or more new browser windows opened under or over the current window or in a window which already exists on results page 59 such as preview window 55, which can be located anywhere on results page 59. Excepting the fixed preview window concept, the invention contemplates that the user can dynamically control the location of the preview window, its size and the duration of its visibility. This allows the user to leave the preview window open while freeing the cursor to move elsewhere and perform other functionality. This feature can be implemented with standard Windows-type mouse and key movements. In the case of a fixed preview window 55, all the same attributes are also controllable, but typically only by a programmer with sufficient access. In addition, the invention contemplates that a programmer or user may control all the functional attributes of a preview window. The following are examples of these controllable functional attributes: (i) the use of a scroll bar; (ii) enabling a hyperlink so that a mouse-over or a click on a link within a previewed page is active and results in a call to the referenced page; (iii), enabling further mouse-over, which allows the user to use her mouse-over in the preview pane; or (iv), or disabling java, or other languages including but not limited to JavaScript, flash, VBScript, Jscript, or DHTML. Lastly, either a user or programmer might also control content filtration such as enabling a porn filter with the use of a preview. This would be useful in protecting those sensitive to explicit information and may be performed by passing the preview information through a filter prior to its display in a preview window. In addition, the preview fiction in general allows users to minimize their exposure to undesired information.

Previews are not necessarily limited to visual information, they can be comprised of audio or any other sensory information that may be encoded in a web page or result and then conveyed to a user over a network for re-creation by the user's client machine.

VII. Relating Icons and Defined Areas

Figure 2:
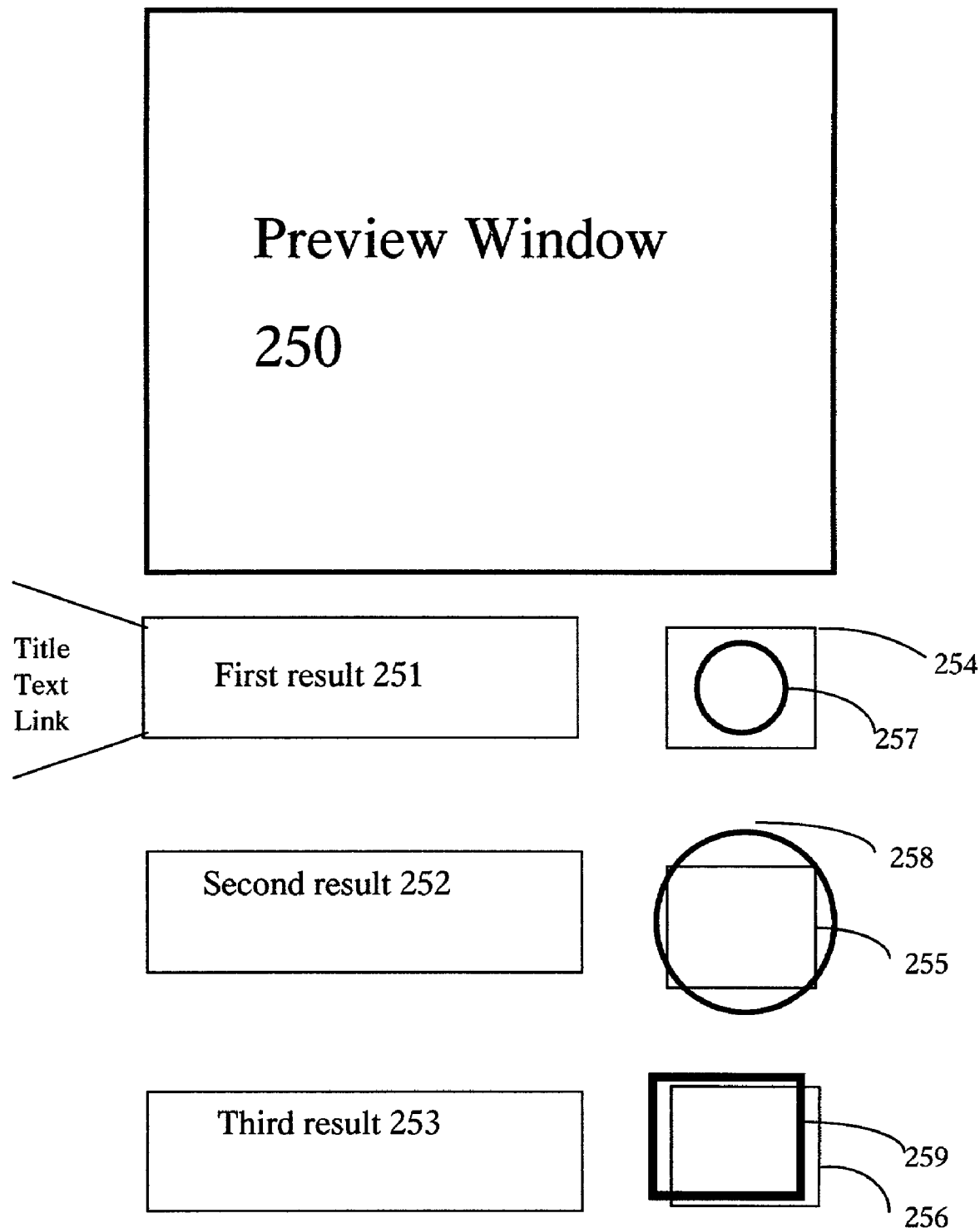
FIG. 2 shows a generic search results page, demonstrating embodiments of the invention.

Referring to FIG. 2, preview window 250 is fixed at the top of the page. As discussed earlier, the invention contemplates that preview windows may be placed wherever esthetically or functionally useful. Also on FIG. 2, first result 251 corresponds with defined area 254 and preview icon 257. In this case, defined area 254 is larger and shaped differently than preview icon 257. This arrangement may have several advantages. First, for quicker navigation and previewing, the larger defined area facilitates showing the preview if the pointer gets close to the preview icon. Second, the larger defined area 254 may be used as an indication that the pointer is approaching the preview icon 257. This indication may initiate the loading of the preview and thereby have some or all of the loading completed by the time the pointer mouses-over the icon 257. Adding another defined area more precisely co-located with icon 257 may enhance this technique. Having two defined areas in this configuration (one larger than icon 257 and one precisely co-located), allows the system to begin loads when the point gets in the area of icon 257 but only display preview information if there is an actual mouse-over the icon 257. This will make the load time appear to be smaller than it actually is. This technique could also be combined with other techniques to speed the loading of information. For example, loading speed may be increased by limiting the nature of the information such as a limitation to text or compressed graphics. Loading may also be accelerated by limiting the quantity of information loaded such as by specifying a size limit (bytes) or degrading the image by loading only some of the information (e.g. every other bit of a bmp file).

Continuing on FIG. 2, first result 251 may contain various information, including a title, descriptive text, excerpt text and a link to the referred web page. Any one or combination of these items may be individually co-located with a defined area that will provide a preview during a mouse over. By using multiple defined areas, a variety of information about the referred web page could be previewed simply by navigating the mouse pointer, for example, mousing-over the title might cause a preview of contextual information about the referred page, mousing-over the descriptive or excerpt text might cause a preview of the actual referred page, and mousing-over the link might cause a preview of information about the link. It is noteworthy that, except for the link, any of the information items (title, text etc.) need not be hyperlinks.

Further discussing FIG. 2, second result 252 corresponds with defined area 255 and preview icon 258. In this case, the invention contemplates that the defined area may be smaller that the preview icon. In addition, FIG. 2 shows third result 253, which corresponds to defined area 256 and preview icon 259. While defined area 256 and preview icon 259 are not shown precisely co-located, the drawing is provided to indicate that the invention contemplates perfectly co-located and co-shaped defined areas and preview icons, which of course might include preview information such as text.

VIII. Floating Preview Windows

Figure 3:
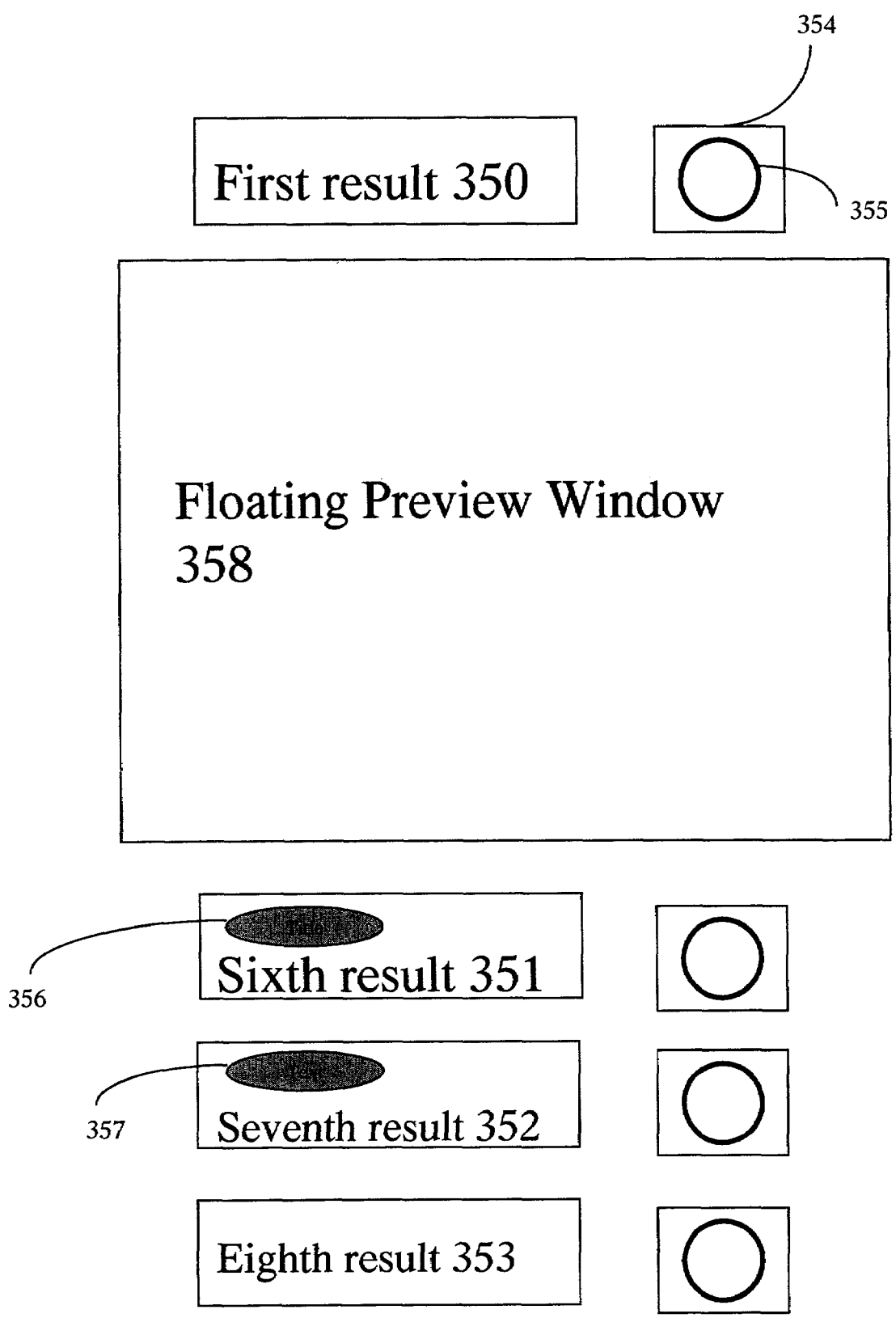
FIG. 3 shows a generic search results page, demonstrating embodiments of the invention.

Referring now to FIG. 3, first result 350 corresponds with defined area 354 and preview icon 355. When the mouse pointer is over defined area 354, floating preview window 358 appears and displays whatever preview information has been defined. Floating preview window 358 covers whatever information is below it on the web page. The invention contemplates that floating preview window 358 may cover the web page portions below it (presumably second through fifth results in this case) either completely, in opaque fashion or semi-translucent fashion. The invention contemplates that a semi-translucent window would allow the user to simultaneously see the information in the window and below the window on the web page.

Referring again to FIG. 3, result 351 is partially co-located with defined area 356 and defined area 356 is approximately co-located with the title of Sixth result 351. In this arrangement, a mouse-over in the area of the title will cause the floating preview window 358 to appear and display the program designated preview information. Similarly, the arrangement surrounding seventh result 352 allows the same type of preview to arise from a mouse-over in the area of the result text (which is partially co- located with defined area 357).

In any case of a floating preview window (and most other preview windows), the invention contemplates that a user may use any combination of pointer navigation and clicks or keystrokes to commit (click-through) to the result, or initiate controls over the preview window such as its endurance, location and size or event the type of preview information.

IX. Multiple, Simultaneous Preview Windows

Figure 4:
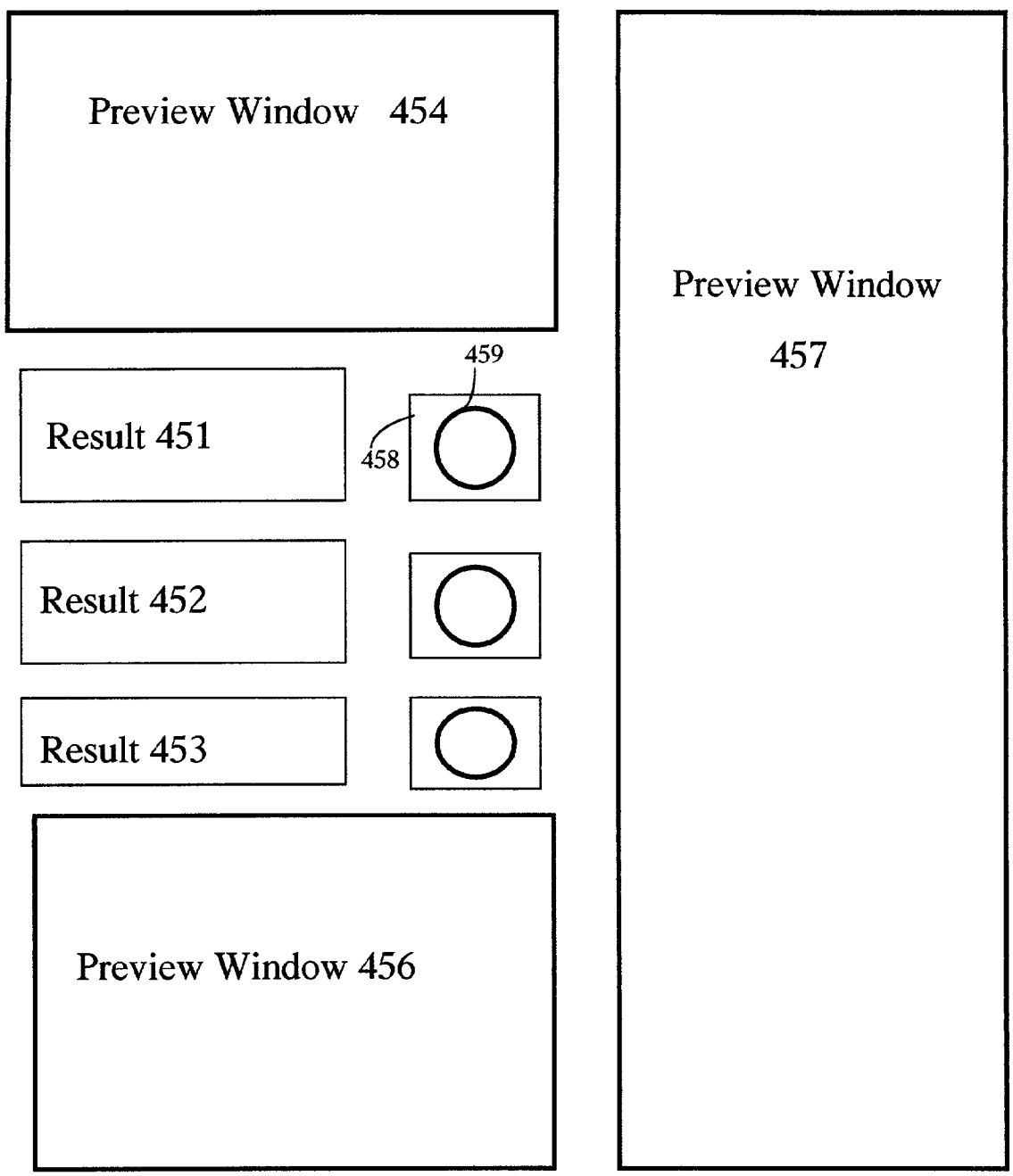
FIG. 4 shows a generic search results page, demonstrating embodiments of the invention.

Referring now to FIG. 4, a search result web page is shown with three preview windows 454, 456 and 457. The invention contemplates preview information displaying simultaneously in two or more windows or frames contained on one or more display devices (or any device that may appropriately reproduce the type of preview information). The invention further contemplates any of the following: all the windows may be fixed on the web page; all the windows may float or appear during the mouse- over; or some windows may be fixed on the web page and others may appear or float during the mouse-over. For example, in one embodiment, a mouse-over defined area 458 (partially co-located with preview icon 459) would display the web page referred by and associated with result 451 in preview window 457. Simultaneously, contextual information regarding result 451 would display in preview window 454 and the home page associated with result 451 would display in preview window 456. In another example, preview window 457 would have the same purpose as the first example, while preview windows 454 and 456 would display information associated with the next and previous search results respectively. These examples are only illustrative of the concepts that multiple preview windows may be used to display any of the preview information discussed herein using windows that are either fixed or appearing during mouse-over.

X. A Technical Example

Some of the more technical attributes of the invention are demonstrated with this example of a user's experience. The user enters a search query into a search system on a client-computing device. The search system returns a results page having JavaScript and DHTML technology. Like the other search results pages discussed herein, the results page also has a finite number results, each including a title, some descriptive text and the relevant URLs. Some or all of the URLs may be web hyperlinks to web pages relevant to the search query. When the user mouses-over a defined area (which corresponds to a hyperlink in this case), JavaScript operates to open a window near the mouse pointer. The resident web browser then fetches the page of preview information and displays a scaled version of the page (in this case 33%) in the window. The page may include gifs, HTML, DHTML, JavaScript, Flash and other browser cognizable content. The user may then commit by clicking through on the preview or the link. The user may also initiate a menu or control system for controlling the function of the available preview functions. Finally, the user may simply move the pointer away, which will cause the window to close.

In this example, the size of the preview box is controlled by a set pixel height and width of the Iframe attribute. The content is shrunk by setting the "ZOOM"stylesheet attribute, which is part of the Cascading Style Sheet offering within Internet Explorer 5.5.

A sample hyperlink follows:
<a class=link onMouseOver="return previewWindow ('<IFRAME height=600 width=800 src=http://www.wine-lovers-page.com/STYLE=zoom:33%;></IFRAME>');" onMouseOut="nd( );" href=http://comet.directhit.com/fcgi-bin/RedirURL.fcg?url=http://www.wine-lovers- page.com/&qry=wine&rnk=4&cz=2661b9d2a06c9edc&src=DH_comet_SRCH>Wine Lovers' Page/Front Page</a>

This link instructs the browser to open up an inline frame that is 800×600 pixels with the resulting page's URL as its source. It then reduces the size of this frame, and it's content by 66% (to 33% scale) and places the inline frame underneath the user's mouse pointer.

XI. Enhanced Preview Icon

Figure 5:
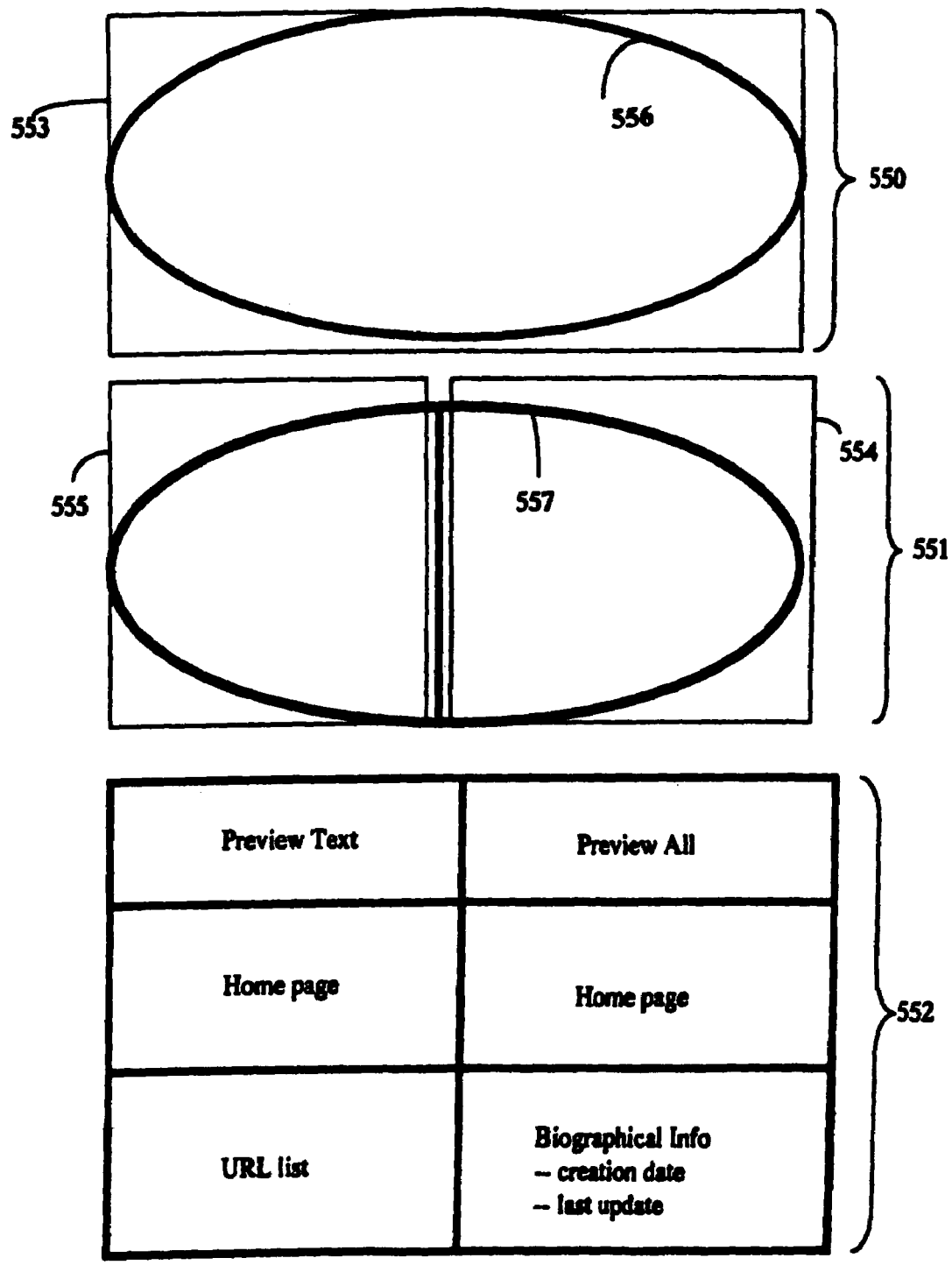
FIG. 5 shows potential preview icon implementations.

Referring to FIG. 5, three potential preview icon implementations are shown 550, 551 and 552. Referring to preview icon implementation 550, preview icon 556 is partially co-located with defined area 553 so that when a mouse-over occurs in the area of preview icon 556 (precisely anywhere over defined area 553), the preview information will display. Advancing on this concept is preview icon implementation 551, wherein preview icon 557 is divided into two regions, each region being partially co-located with its own defined area, in this case 554 and 555. The concept of separating regions in the preview icon allows the user to dynamically and automatically determine what to preview. One example is to allow the user to select between a text-only preview and a full preview—allowing users to choose a preview based upon their patience for the loading of the speed of their connections.

Advancing further on the concept, preview icon implementation 552 demonstrates that the preview icon may have several regions to offer choices or may even be a collection of apparently separate icons for the same reason. Of course, each region would be associated with a proximately located defined area (not shown for preview icon implementation 552). In practice, a user would simply mouse-over a portion of the preview icon to indicate an instruction for the system to display the designated preview. The invention contemplates that a user might commit to the preview with a click or keystroke combination.

Advancing yet further on the concept, a preview icon may change form upon the users choice, indicated by a mouse click, a keystroke or combinations of those actions. For example, a search result page may feature preview icons resembling implementation 550. After display of the preview information, the user may click on preview icon 556 causing it to transform to a menu-type preview icon like implementation 552. The invention contemplates that the preview icon may transform into any other type of preview icon or into any type of menu system, such as the common menu systems for MS Windows-based software products. The invention also contemplates that a click or keystroke combination with respect to a more simple preview icon implementation (like 550) may separately initiate a control menu system or create a separate preview icon allowing more complex controls of the preview functions (like implementation 552).

XII. Network Context

Figure 6:
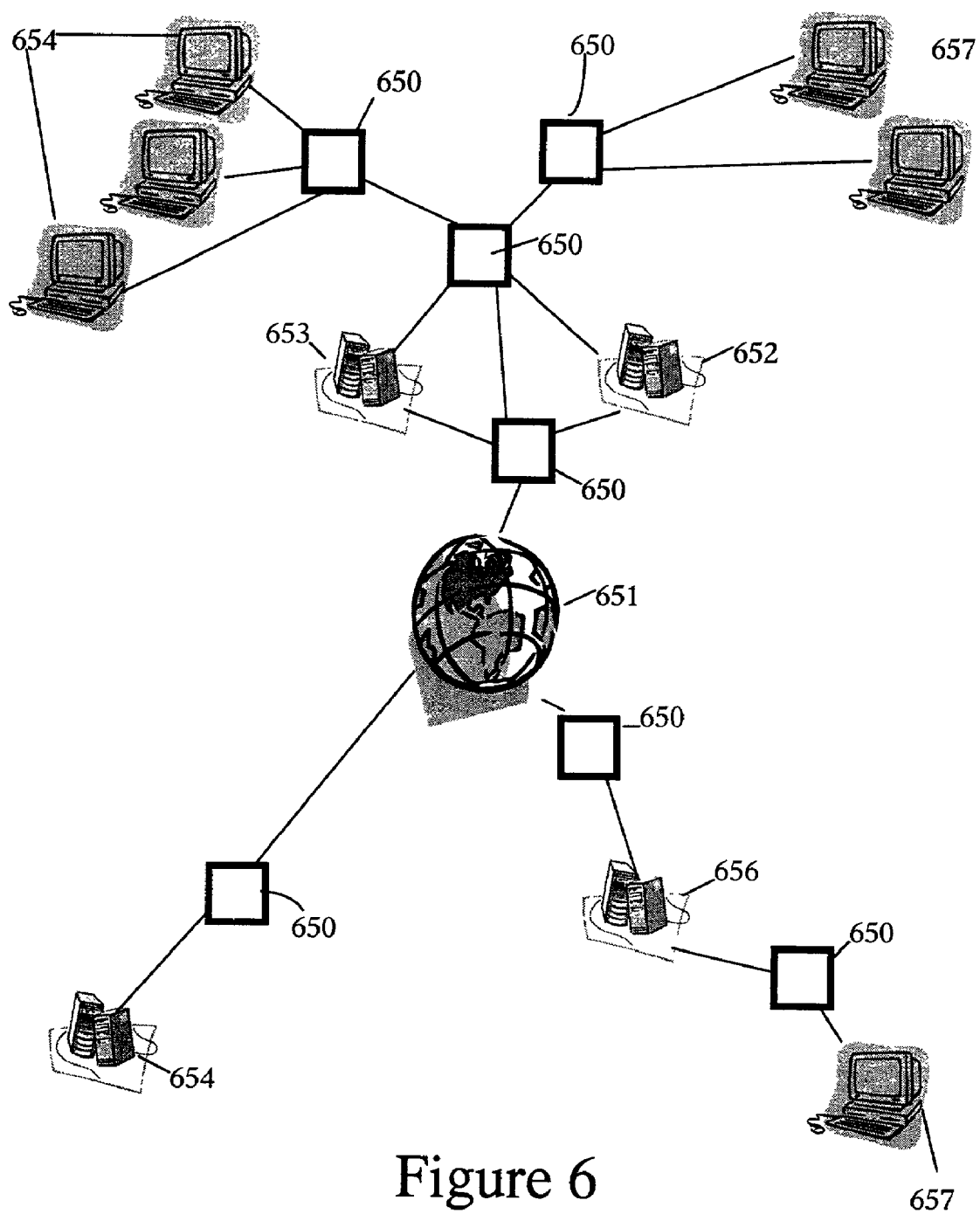
FIG. 6 shows a network, including the Internet.

During the past several years, many believe that the interconnection between computers (the "network") has become more prominent and important than the computing itself. For this reason, the invention shall be briefly explained within the context of the network. Referring to FIG. 6, an imaginary and typical network is shown including the Internet. User computers 657 connect to each other as well as other portions of the network through switching devices 650 such as hubs, routers, switches, bridges and other devices, which are commonly known in the area of networking. The network also includes servers 653 (many of which include mass storage devices such as disk drives) and the Internet 651. Other intelligent devices may attach to the network such as dedicated storage devices and virtually all forms of intelligent machines and appliances. All of these items are connected together by a series of information links including switching devices 650. Some links may use conductive wires and others may be wireless (using radio waves or light), or fiber optic (using light and light-carrying cable).

Information is carried across the network in small pieces, typically called packets or frames. A system originating information will create packets, put an address on the packets and send them out over the network destined for the addressed system. Intermediary switching devices 650 or servers 653 or other intelligent devices may manipulate the packets. They may disassemble and reassemble the same or different packets, add or delete data and information or send original messages to the addressee or source. The packets containing the original information eventually propagate through the network and reach their destination.

In the context of the current invention, searching or querying typically originates at a user computer 657, and the query typically travels over the network to a data source (usually, but not always associated with a server 653). An intelligent system services the query at or near the data source and sends the result back, over the network, to the user computer 657 that originated the request. While the entire process might occur on a single computer or system, the network is typically the medium that allows search and query of very large information stores and for this reason disserves mention along with the current invention. In most embodiments of the current invention, virtually all the preview information must traverse the network. Control information also usually traverses the network but sometimes may exist in a program at the user' terminal.

Within the network context, there are several architectures that may be used to construct systems that exploit the invention. Some examples follow. In one implementation, the preview document may be retrieved from a cache maintained near the data store and probably by the authority that performs the search. In this instance, before forwarding across the network to the user, the preview information can be accessed local to the database and the preview page could be pre-cleansed of offensive content such as unwanted JavaScript.

In a second implementation, whether cached or not, the preview information can be converted to an image file at the site of the search provider. Like the pre- cleansing above, this would avoid offensive program content. However, this may also increase latency to deliver the preview across the network to the user machine.

In yet a third implementation, the search provider might place a re-direct between the user and the preview information (in this case HTML). This layer between the user and the search service creates an opportunity to remove offensive program content.

The possibilities for architectures are limitless and might include using Java or JavaScript techniques disable offensive content or to speed up the pages' entrance into the users' browser cache.

In addition to highlighting architectural options, the network context also raises implementation options. For example, consider the case when the user mouses- over the first result and the system calls across the network for preview information relating to that first result, presumably from the search authority. The search authority may then identify the first result as part of a special group or program and return preview information according to that special status rather than the preview information otherwise applicable to the first result. This type of special grouping or status may be part of a paid inclusion program to generate revenue for the search authority.

XIII. Improving Search Results

Preview information provides users with a tool to efficiently and thoroughly evaluate search results prior to committing to a click through. There are aspects of the users' evaluation processes that may be useful in factoring how well the search result matched the query for any particular user and query. Referring to FIG. 6, a client system 657 may be configured to monitor the keystrokes, mousing and related timing for a user reviewing a search results page that was generated elsewhere on the network and is viewed on the client system 657. The results of the monitoring (or attributes) may then be sent across the network to the either the search provider or the owner of the web page hosting the search.

Figure 7:
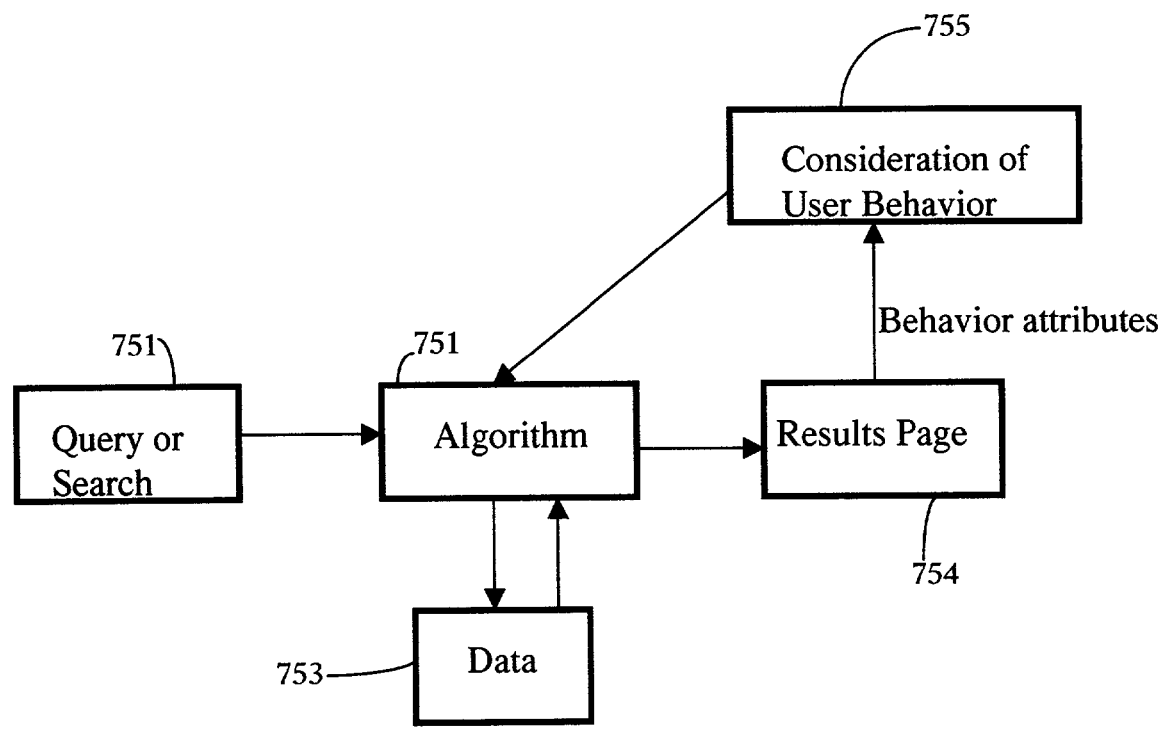
FIG. 7 is a flow diagram associated with the invention.

At a very high conceptual level, this is explained with reference to FIG. 7, wherein a query or search 751 is submitted to an algorithm 752 for searching a large data store 753. The algorithm 751 and/or the data store 753 may contain information about millions of documents and web pages but also about common queries and relevance factoring. A combination of the algorithm 751 and the data store 753 generate a results page 754, which generally lists documents or web pages that relate to the query in the order of their perceived relevance. The invention contemplates that the user's use of preview information is monitored while the user evaluates the results page. More particularly, the invention contemplates that there is monitoring of any or all of the following: (i) which result is being previewed by order or rank, (ii) the length of each preview, (iii) the order of previewing, (iv) the number of results previewed per page, and (v) whether there is a click-through. These attributes of the user behavior may be forwarded across the network to a program-designated place and later used in a consideration process, which will lead to conclusions about the relevance of the results originally presented. These conclusions can be used to alter the algorithm and/or data so that the same or similar queries will yield more relevant results.

Some examples of conclusions that can be made from monitoring attributes are as follows.

A long duration of preview time indicates more relevance to a particular result and, depending on that result''' original ranking, a higher relevance ranking may be due. A very short duration indicates the opposite.

The number or percentage of previews per search page indicates how easy the user could find an acceptable document. For example, if the user previewed only two documents before a click-through, then an acceptable result was easy to find. If the user previewed all the results on a results page, then the result was less easy to find, and the eventual click-through was less likely to have been ideal to the user (the assumption is that she settled after looking for a while).

The rank of a previewed site may be relevant in that a preview indicates user interest. Therefore, if the original rank was low, there may be cause for alteration.

The order of preview is also of interest in that previewed results are presumptively more relevant and non-previewed results were seemingly easily eliminated and therefore presumptively far less relevant.

These techniques may be combined with other searching techniques such as those discussed in U.S. Pat. No. 6,182, 068 entitled Personalized search methods.

XIV. Non-limitation.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

Titles and subtitles used in the text are intended only as focal points and an organization tool. These titles are not intended to specifically describe the applicable discussion or imply any limitation of that discussion.

The invention claimed is:

1. In a system having a display device and user input mechanisms including a pointer, a query result page comprising:
    a plurality of results, each associated with an item in a data store of information;
    a plurality of defined areas, each associated with at least one such result;
    a first defined area arranged to intuitively imply a relation with respect to a first result;
    a first data item in said data store, referred by and associated with said first result;
    at least one preview window associated with said result page and displaying preview information regarding said first result when said pointer navigates over said first defined area,
    wherein the at least one preview window is fixed in size, shape and location upon said query results page, and
    wherein the size, shape and location of said preview window is configurable by the user,
    yet fixed after configuration.

2. The invention of claim 1 wherein the at least one preview window first appears locating floating proximate in location to said pointer.

3. A method of providing preview information comprising the steps of:
    providing a preview icon, in textual, graphic or combined form, that contextually indicates the availability of preview information;
    providing a search result associated with said preview icon;
    providing one or more defined areas, each that is at least partially co-located with said preview;
    providing one or more display windows;
    displaying in one or more said display windows, preview information intuitively related to said search result; and
    converting said preview icon into a menu upon user indication.

4. A method of providing preview information comprising the steps of:
    providing a preview icon, in textual, graphic or combined form, that contextually indicates the availability of preview information;
    providing a search result associated with said preview icon;
    providing one or more defined areas, each that is at least partially co-located with said preview;
    providing one or more display windows;
    displaying in one or more said display windows, preview information intuitively related to said search result; and
    expanding the functional options available through said preview icon upon user indication.

* * * * *